United States Patent [19]

Kersting et al.

[11] 4,204,449
[45] May 27, 1980

[54] FLYING CROPPING SHEARS FOR HOT STRIP

[75] Inventors: Emil F. Kersting, Ratingen; Rolf Schulte, Düsseldorf, both of Fed. Rep. of Germany

[73] Assignee: SACK GmbH, Düsseldorf, Fed. Rep. of Germany

[21] Appl. No.: 840,968

[22] Filed: Oct. 11, 1977

[30] Foreign Application Priority Data

Oct. 8, 1976 [DE] Fed. Rep. of Germany ....... 2645398

[51] Int. Cl.² ............................................. B26D 1/56
[52] U.S. Cl. ........................................ 83/328; 83/305; 83/288; 83/303
[58] Field of Search ................ 83/328, 303, 479, 480, 83/288, 300, 304, 305

[56] References Cited

U.S. PATENT DOCUMENTS

| | | | |
|---|---|---|---|
| 3,264,920 | 8/1966 | Hallden | 83/328 X |
| 3,269,245 | 8/1966 | Flineau | 83/305 |

FOREIGN PATENT DOCUMENTS

906536 3/1954 Fed. Rep. of Germany ............ 83/328

Primary Examiner—Donald R. Schran
Attorney, Agent, or Firm—John J. Dennemeyer

[57] ABSTRACT

Flying cropping shears for hot strip for two horizontally spaced pairs of cutters. The cutters are driven by parallel crank drives through connecting members which maintain parallelism of the cutters. Means are provided for selectively bringing the pairs of cutters into and out of the cutting position. In this way only one pair of cutters is operative during rotation of the crank drives so as to crop either the front or the rear end of the hot strip.

6 Claims, 1 Drawing Figure

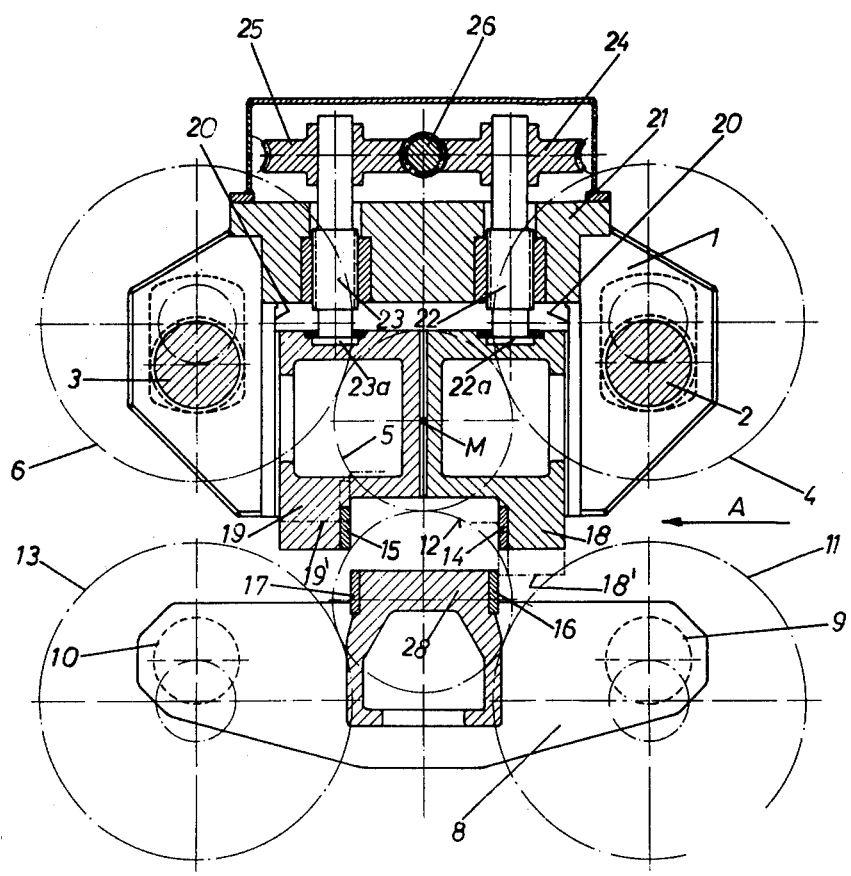

FLYING CROPPING SHEARS FOR HOT STRIP

When rolling hot strip in so-called wide strip mills, it has proved appropriate to provide cropping shears between the roughing train and the continuous finishing train, in order to crop the rough rolled slabs at both ends by a flying cut before they enter the finishing train. For this it is known to use rotating drum shears with two pairs of cutters, in particular in order to be able to use various cutters for cropping the front end of the strip on the one hand and the rear end of the strip on the other hand. It is desirable that both cropped ends of the strip are cut with a bevel or in a convex manner and not in a concave manner, i.e. curved inwards, since then, during the subsequent multi-pass rolling operation, the edge regions of the end of the strip cropped in this way are rolled to a greater extent and this produces a configuration similar to a fish tail at the end of the strip. However, it is harmless and desirable for the centre of the strip to be rolled in the shape of a tongue due to a bevelled or convex cut at the time of cropping (German AS '23 30 407).

However, the same requirement exists when plates are rolled with a reversing action in a plate rolling mill and the cropping shears should be located close to the stand, since in this case also the cropping shears must be flying shears.

In the known drum shears each with two peripherally distributed cutters, which co-operate in pairs for the cut, the most favourable starting position cannot always be adjusted for the pair of cutters provided for the cut, so that not only are large angular accelerations necessary for initiating a cropping operation, but also the starting pulses must be emitted at different times, according to whether the front or rear end of the strip is to be cropped. Furthermore, large thicknesses of strip cannot be cut without considerable problems or cannot be cut at all with rotating drum shears, owing to the engagement conditions of the cutters.

The invention is thus based on flying cropping shears for hot strip with two pairs of cutters and the object is to make the selective use of one or other pair of cutters independent of the starting position of the shears and to design the shears to carry out clean cropping cuts even in the case of considerable thicknesses of strip. The solution of this object firstly consists of the choice of a construction in the form of parallel crank shears with two pairs of connecting members rotating in synchronism in opposite directions for keeping the cutters parallel during cutting, i.e. so-called four-crank shears approximately according to German Patent Specification No. 838 388. The invention further consists in that the connecting members support two pairs of cutters arranged at a horizontal distance apart and each pair of cutters can be brought selectively into or out of the cutting position in a motorised manner. The term "motorised" naturally includes the use of hydraulic or pneumatic means, in order to bring one pair of cutters into the cutting position and the other pair of cutters out of the cutting position for carrying out successive cropping cuts on one and the same rolled stock in the fastest possible manner.

Due to the invention the shears can always be placed at the same and—as regards the necessary angular acceleration—most favourable starting position, since before starting up of the shears, due to the motorised adjustment of the pairs of cutters, one is certain which pair of cutters is about to cut and which is not. In addition, parallel crank shears for hot strip provide the guarantee that clean cropping cuts are produced, owing to the fact that the cutters are kept parallel.

Appropriately, each pair of cutters is brought into or out of the cutting position by shifting the stroke of at least one cutter of each pair of cutters. A common motorised drive is thus recommended for an oppositely directed stroke shift of the two cutters, in order that both cutters do not cut due to a faulty control and the shears are not overloaded.

Appropriately it is the upper cutters, whose stroke can be shifted selectively, in order to cause solely the selected pair of cutters to carry out the cropping cut. Constructional details are given in claims 4 to 6, where the mirror-image arrangement of the cutters according to claim 6 serves for the fact that the separated cropped ends can fall freely onto the waste conveyor.

It is conceivable and according to claim 7 is within the framework of the invention as the second solution of the object set, if the mirror-image arrangement of the cutters is reversed, i.e. the front surfaces of the two lower cutters are located opposite each other at a distance apart and the motorised stroke shift of at least one cutter of each pair of cutters is dispensed with. This variation is described in detail with reference to the following description of the drawings.

The drawings show one embodiment of flying cropping shears for hot strip according to the invention in a vertical section through the connecting members able to move in opposite directions and their cutter supports.

The upper connecting member 1 connects two cranks 2 and 3 of crank shafts which are not shown, which are synchronised to move in parallel by gears 4, 5 and 6 shown in dot-dash line. One of the two crank shafts is driven, which is not shown in detail. The lower connecting member 8 connects two cranks 9 and 10 shown in broken line, whose crank shafts (not shown) are synchronised to move in parallel by gears 11, 12 and 13. Since the two intermediate gears 5 and 12 are in mesh, the gears located one above the other rotate in opposite directions. For a direction of travel of the hot strip to be cropped according to arrow A, the gear 4 travels in clockwise direction and the gear 11 in counter-clockwise direction, which is also true for the connecting members 1 and 8, which thus rotate in synchronism in opposite directions. To this extent, the construction of the flying cropping shears corresponds to the construction of so-called parallel crank shears for hot strip according to German Patent Specification No. 838 388, in which case it should be stated that in the case of shears for cutting strip, the cranks 2, 3, 9 and 10 extend between two shear stands, in which the associated crank shafts are mounted and that a pair of connecting members 1, 8 respectively are associated with both the upper pair of cranks 2, 3 as well as the lower pair of cranks 9, 10, which connecting members support cutters extending approximately over the distance between the shear stands.

According to the invention, the two pairs of connecting members 1 and 8 rotating in synchronism in opposite directions, support two pairs of cutters located at a horizontal distance apart. In the embodiment, the upper connecting members 1 are provided with two upper cutters 14, 15, which are arranged symmetrically with respect to the vertical plane of symmetry of the shears such that their front surfaces are at a distance apart. This means that the front surfaces of the lower cutters 16 and 17 supported by the lower connecting members 8 point outwards.

In the embodiment, the upper cutters 14, 15 are vertically adjustable in an individual manner for the selective stroke shift. Associated with the upper cutters are two cutter supports 18 and 19 separated from each other and located side-by-side, which supports are guided in sliding guides 20 of the upper connecting members 1. Each upper connecting member 1 comprises a bridge 21, which extend beyond the spacing of the two sliding guides 20 and at the side each support a pair of adjusting screws 22 and 23. The adjusting screws 22 on both sides of the shears are connected to the cutter support 18 in a manner resistant to tension and compression at their ends at 22a, whereas the adjusting screws 23 are connected in a manner resistant to tension and compression to the cutter support 19 at 23a. Each of the four adjusting screws 22 and 23 is non-rotatably connected to a worm wheel 24, 25 and in the embodiment, all four worm wheels are driven by a common worm shaft 26, which extends from one shear stand to the other like the cranks 2, 3, 9 and 10. The adjusting devices 22, 24 or 23, 25 associated respectively in pairs with one of the cutter supports 18 or 19 thus have a common motorised drive for an oppositely directed stroke shift of the two upper cutters 14 and 15, since during a rotation of the common worm shaft 26, the pairs of worm wheels 24, 25 rotate in opposite directions, so that—presupposing a synonimous thread of the screw-threads of the adjusting screws 22 and 23—the cutter support 19 with the upper cutter 15 is moved upwards into the position 19' shown in dot-dash line, when the upper cutter support 18 with the upper cutter 14 is moved downwards into the position 18' shown in dot-dash line. With this setting, the pair of cutters 14, 16 comes into the cutting position during rotation of the connecting members 1 and 2, whereas the pair of cutters 15 and 17 is reliably out of the cutting position, in order that both pairs of cutters do not cut virtually in the manner of a stamping cut and the shears are not overloaded, which would be possible due to faulty controls if the common motorised drive for an oppositely directed stroke shift by means of the worm shaft 26 were not present.

With the specified direction of travel of the hot strip according to arrow A, the rear end of the strip is cropped by the pair of cutters 14, 16, so that the cropped ends can fall onto a waste conveyor (not shown) between the two lower connecting members 8. The same is true for the front cropped ends, which are separated by the pair of cutters 15, 17, when the common worm shaft 26 is rotated so far that this pair of cutters is brought into the cutting position and the pair of cutters 14, 16 is brought out of the cutting position.

The method of operation of the flying cropping shears according to the invention is as follows:

In contrast to the illustration in the drawings, the starting position of the shears is outside the relative position of all the parts with respect to each other, shown symmetrically, to such an extent that for cropping the rear end of the strip for example, the adjusting devices can be actuated such that the upper cutter 14 is adjusted in a downwards direction, without the passage of the strip in the direction of arrow A being hindered. An angle of more than 270° is thus available for starting up the shears, the shears are started by signals from an arrangement of photoelectric cells, which scan the rear end of the rolled strip. The arrangement of photo-electric cells in the region of the roller bed can appropriately be adjusted to and fro between two end positions located at a distance from the two pairs of cutters, since a longer distance must be covered by the rolled stock for cropping the front end of a hot strip until it travels through the pair of cutters 15, 17. Naturally, two arrangements of photo-electric cells are also conceivable at the distance of the pairs of cutters from each other, which are selectively started or stopped, in order, with a constant starting position of the shears and (in adaptation to the respective speed of advance of the hot strip) in the case of uniform acceleration conditions on the driving side, to adapt the signals coming from an arrangement of photo-electric cells to the different distances, which one end of a sheet to be cropped has to travel, when it must pass beyond the cutting region of the pair of cutters 15, 17 for cropping the front end, but does not need to pass beyond the cutting region of the cutters 14, 16, when cropping the rear end of the strip.

Naturally, the requirements which result from the varying distances travelled by the ends of the strip until they reach the cutting region of the pair of cutters respectively associated therewith, have to be controlled with a single stationary arrangement of photo-electric cells, when the starting position of the shears is pre-set differently. All this is known to a man skilled in the art, who deals with starting controls for flying shears.

The principle of the invention, in parallel crank shears for flying cropping of hot strip, of providing two pairs of cutters located at a horizontal distance apart and of bringing each pair of cutters selectively in a motorised manner into or out of the cutting position, is to be achieved without a separation into two individually adjustable upper cutter supports 18 and 19. One conceivable variation consists of providing for the upper cutters 14 and 15, a common cutter support which is in one piece with or connected to the two upper connecting members 1 and of adjusting the connecting members relative to their cranks 2 and 3 in opposite directions such that the connecting members are adjustable between two different inclined positions. In one inclined position, only one pair of cutters comes into a cutting position, whereas in the other end position, only the cutters of the other pair are able to cut. With this solution, the crank shafts associated with the cranks 2 and 3 must ideally be able to be adjusted by adjusting devices on swinging arcs with the centre point M of the gears 5, unless, one allows the engagement ratios between the gears 4 and 6 on the one hand and the gear 5 on the other hand to undergo an alteration. In this variation, the spacing of the two pairs of cutters is chosen to be particularly large in order to keep the swinging region for the upper connecting members 1 small.

The invention includes a second solution of the object set, in which a selective adjustment of one of each of the two pairs of cutters into or out of the cutting position is unnecessary. Both pairs of cutters have a relationship with respect to each other such that they could overlap and cut for each passage of the shears. This solution consists in the reversal of the symmetrical cutter arrangement according to claim 7, which can be explained graphically in that one looks at the diagrammatic illustration rotated through 180°; i.e. the upper cutters become the lower cutters and the lower cutters become the upper cutters, as illustrated for stationary cropping shears in German Gebrauchsmuster No. 6 930 497. Due to the necessary changed starting control, with respect to the different distances to be covered by the ends of the strips, as already explained, it was solely necessary to pay attention to the fact that when cropping a front end of the strip by the pair of cutters located first in the feed direction of the strip, the front end is still located inside the spacing of the lower cutters, so that the second cutter carries out an idle cut, furthermore, it was necessary to pay attention to the fact that the rear end of the strip is within the spacing of the lower cutters, when the second pair of cutters is intended to cut, in which case the first pair of cutters carries out an idle cut. With this second solution of the object set, the two pairs of cutters are appropriately located on the connecting members with the largest possible spacing, since the size of the cropped ends cannot be greater than the spacing of the lower cutters. The cutter supports for the lower cutters, which supports are appropriately in one piece, which may be in one piece with the connecting members in the crank plane, must be provided with a recess over the length of the lower cutters, in order that the cropped ends may fall down onto a waste conveyor.

What is claimed is:

1. In a parallel crank flying cropping shear for hot strip including upper and lower parallel connecting members, each of said connecting members including means synchronizing one connecting member with the other connecting member for synchronous counter-rotation of the connecting members, said parallel crank cropping shear further including the improvement comprising:

two pairs of cutters, one of each pair being mounted on the upper connecting member and the other of each pair being mounted on the lower connecting member, said synchronizing means including means for maintaining parallelism of said upper and lower cutters in a pair; and means for selectively bringing one of said pairs of cutters into a cutting position and for bringing the other of said pairs of cutters out of the cutting position.

2. Flying cropping shears according to claim 1, wherein said means for selectively bringing includes means for moving at least one cutter of each pair of cutters.

3. Flying cropping shears according to claim 2, wherein said means for selectively bringing comprises a common drive means for moving one cutter of each pair in opposite directions.

4. Flying cropping shears according to claim 3, wherein there is further included means for positioning the upper cutter of each pair and the upper connecting member is provided with sliding guides and with a pair of adjusting screws respectively for each of the two upper cutters which are each connected at their ends to an adjusting screw in a manner resistant to tension and compression.

5. Flying cropping shears according to claim 4, wherein each of the four adjusting screws is non-rotatably connected to a worm wheel and all worm wheels are driven by a common worm shaft.

6. Flying cropping shears according to claim 1, comprising a mirror-image arrangement both of the two upper cutters and of the two lower cutters such that the front surfaces of the upper cutters are located opposite each other at a distance apart.

* * * * *